No. 875,713. PATENTED JAN. 7, 1908.
O. LANGE.
TRIMMING ATTACHMENT FOR LOOPING MACHINES.
APPLICATION FILED SEPT. 12, 1906.
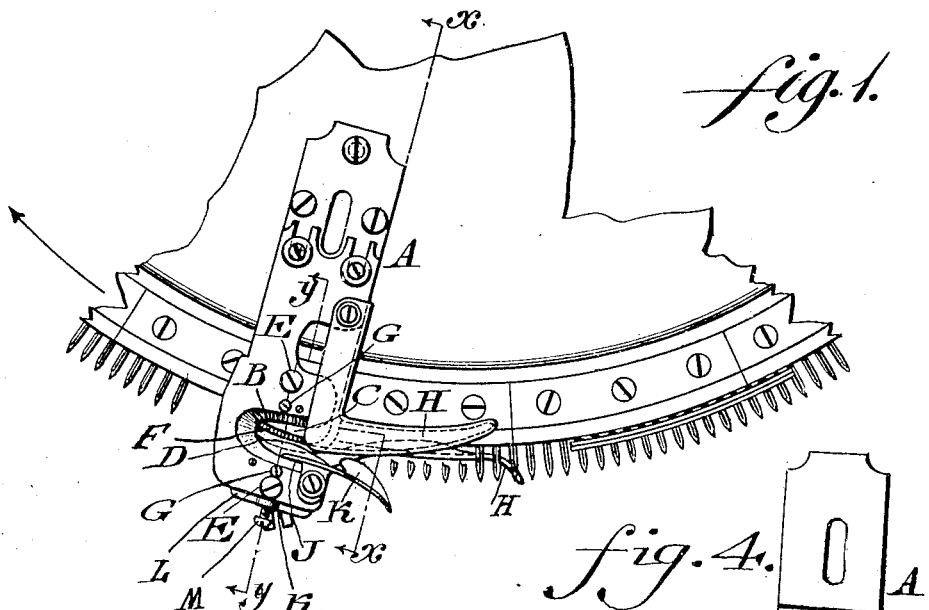
fig. 1.
fig. 4.
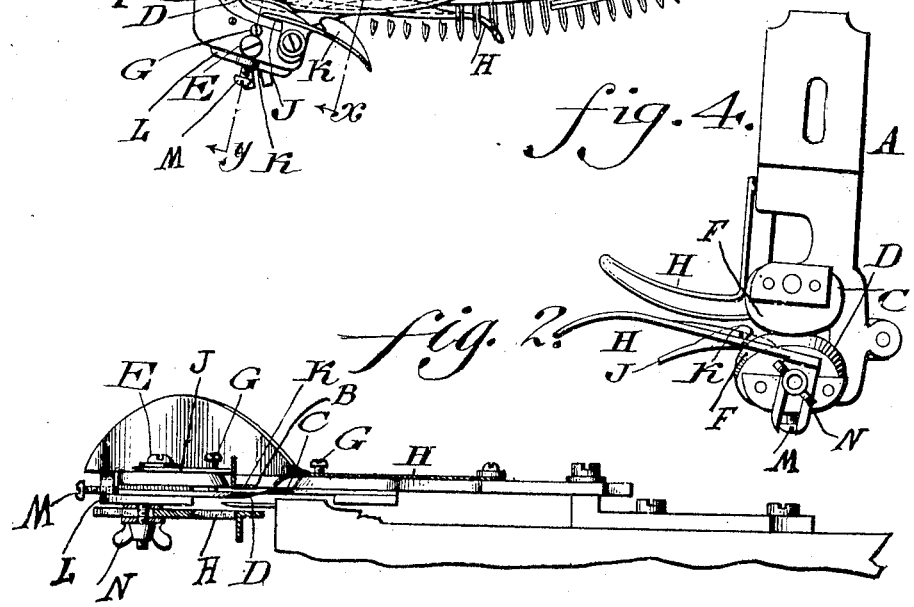
fig. 2.
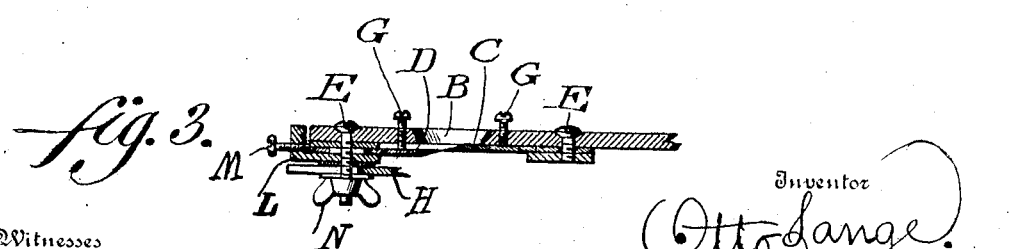
fig. 3.
Witnesses
L. Douville,
P. F. Nagle.
Inventor
Otto Lange.
By Diedersheim + Fairbank
Attorneys

UNITED STATES PATENT OFFICE.

OTTO LANGE, OF CAMDEN, NEW JERSEY.

TRIMMING ATTACHMENT FOR LOOPING-MACHINES.

No. 875,713.  Specification of Letters Patent.  Patented Jan. 7, 1908.

Application filed September 12, 1906. Serial No. 334,280.

*To all whom it may concern:*

Be it known that I, OTTO LANGE, a citizen of the United States, residing in the city and county of Camden, State of New Jersey, have invented a new and useful Trimming Attachment for Looping-Machines, of which the following is a specification.

My invention consists of a trimming attachment for a looping machine composed of a pair of blades having their cutting edges set opposite to each other, so that when the fabric to be trimmed is presented to said edges, it is pushed or advanced against the same and thus trimmed without the necessity of moving the blades after the manner of shears.

It also consists of means for adjusting the blades so that their cutting edges may be set true to each other.

It further consists of novel means for guiding the fabric to the blades.

Figure 1 represents a top or plan view of a trimming attachment for a looping machine embodying my invention. Fig. 2 represents a section on line x—x Fig. 1. Fig. 3 represents a section on line y—y Fig. 1. Fig. 4 represents a bottom plan of the attachment.

Similar letters of reference indicate corresponding parts in the figures.

Referring to the drawings: A designates a plate adapted to be attached to a suitable portion of a looping machine, the same having in its side the throat B below the walls of which are the blades C and D which are secured in position by screws E which, in the present case, are passed through said plate and blades, it being noticed that the cutting edges of the blades C and D are on the inner sides of the same and so are opposite to each other, without overlapping, whereby the portion of the fabric to be trimmed, when presented to said edges and advanced, will be engaged by the same and so cut-off or trimmed. In order that said portion of the fabric may gradually approach the cutting point of the blades, the fronts of the cutting edges are flaring as at F, the same being most clearly shown in Fig. 1.

In order to adjust the blades at a greater or less distance from the plate A and set the cutting edges thereof true to each other, there are fitted to the plate A, adjacent to the throat B, the screws G whose points are adapted to bear against the faces of the blades, so that when the cutting edges of the latter are adjusted relatively to each other, said screws G are tightened against the blades and thus by the coaction of the screws E, said blades are controlled against improper movement and their cutting edges are reliably held as set.

H designates flaring guides which are connected with the plate A and project in front of the blades C, D, in line with the throat so as to uniformly and reliably direct the fabric to the cutting ages of the blades.

J designates an auxiliary guide which is secured to the plate A adjacent to the throat B and in front of the blades C, D, it having on its inner side the lip K, see Fig. 2, the latter occupying a position above the cutting edges of said blades, so as to overhang in front of the throat B. By this provision, the portion of the fabric as it approaches said cutting edges, passes under said lip and so is prevented from rising, while it is also guided true during the trimming operation.

I do not limit myself to trimming fabrics passing from a looping machine, as it may be applied to other machines where fabrics therefrom require to be trimmed.

Fitted in a plate L, secured to the plate A, is a screw M whose inner extremity bears against the blade D and prevents the latter from moving outwardly after it has been properly adjusted relatively to the blade C. The screw E which passes through the blade D has fitted thereon a thumb nut N which when tightened clamps the blade D and guide H firmly in their adjusted positions.

Having thus described my invention, what I claim as new and desire to secure by Letters Patent, is:

1. A trimming attachment for the purpose stated, composed of stationary blades with their cutting edges on the inner sides oppositely disposed and relatively adjustable to and from their support and to and from each other.

2. A trimming attachment for the purpose stated, composed of stationary blades with their cutting edges on the inner sides oppositely disposed and relatively adjustable to and from their support and to and from each other, and a plate with which said blades are connected, said plate having a throat adjacent to said cutting edges.

3. A trimming attachment for the purpose stated consisting of a pair of blades having cutting edges on their inner sides opposed to each other without overlapping, a carrier for said blades and screws on said carrier adapted to engage said blades to adjust the same at right angles to their length relatively to the face of said carrier.

4. A trimming attachment for the purpose stated consisting of a pair of stationary blades having their cutting edges on their inner sides opposed to each other, a carrier for said blades and a device on said carrier in front of said edges for preventing rising of the fabric to be trimmed and guiding the latter true to said edges.

5. In a trimming attachment for the purpose stated, a supporting plate and relatively adjustable stationary blades affixed thereto for adjustment relatively to said plate and to each other with their cutting edges on their inner sides opposed to each other without overlapping, the fronts of said cutting edges being flared.

6. In a trimming attachment for the purpose stated, a supporting plate, blades affixed thereto with their cutting edges on their inner sides opposed to each other in parallel planes without overlapping, the fronts of said cutting edges being flared, and means passed through said plate and bearing against said blades between their points of attachment and their cutting edges, for adjusting said blades relatively to the said plate and the cutting edges of the blades.

OTTO LANGE.

Witnesses:
   JOHN A. WIEDERSHEIM,
   S. R. CARR.